United States Patent [19]

Kurczak et al.

[11] 4,147,248

[45] Apr. 3, 1979

[54] DIVIDING CONTAINER CONVEYOR

[75] Inventors: Walter Kurczak, Chicago; Richard Anthony, Lombard, both of Ill.

[73] Assignee: Mojonnier Bros. Co., Chicago, Ill.

[21] Appl. No.: 844,219

[22] Filed: Oct. 21, 1977

[51] Int. Cl.² ............................................. B65G 47/26
[52] U.S. Cl. .................................. 198/358; 198/367; 198/437; 198/442
[58] Field of Search ............... 198/358, 367, 437, 442, 198/436, 601

[56] References Cited

U.S. PATENT DOCUMENTS

| | | | |
|---|---|---|---|
| 1,288,962 | 12/1918 | Moore | 198/437 |
| 2,670,835 | 3/1954 | Huttmann | 198/442 |
| 2,987,251 | 6/1961 | Alexander et al. | 198/442 |
| 3,342,303 | 9/1967 | Onulak | 198/442 |
| 3,467,236 | 9/1969 | Dhanda | 198/436 |
| 3,999,648 | 12/1976 | Kennedy | 198/437 |

*Primary Examiner*—Joseph E. Valenza

*Attorney, Agent, or Firm*—Olson, Trexler, Wolters, Bushnell & Fosse, Ltd.

[57] ABSTRACT

A dividing conveyor system is disclosed for directing articles such as milk bottles traveling along a stem conveyor to either a first or second branch conveyor. The divider conveyor system includes a diverter assembly disposed over the intersection point of the stem, first and second branch conveyors, and a diverter positioner for locating the diverter in an appropriate position to divert articles from the stem conveyor to either of the branch conveyors. A first branch sensor is located near the first branch conveyor and downstream of the conveyor intersection point, and a second sensor is correspondingly located near the second conveyor and downstream of the conveyor intersection point. Appropriate switching circuitry includes logic elements to divert articles from the stem conveyor to a branch conveyor at which the associated branch sensor has sensed the absence of articles on that branch conveyor. If both branch conveyors have been filled with articles, additional articles coming in along the stem conveyor are directed into a storing array against a bumper stop.

9 Claims, 5 Drawing Figures

DIVIDING CONTAINER CONVEYOR

BACKGROUND OF THE INVENTION

This invention relates generally to article transport systems and more particularly concerns article-transporting conveyors and related systems for controlling the flow of articles along those conveyors.

Modern dairies and beverage bottling plants fill and cap large numbers of bottles at high speeds. These bottles are then transported by a conveyor system to cartonizing equipment, which places the filled and capped bottles in appropriate cartons. The filled cartons are then transported by another conveyor system to stackers which arrange the filled cartons in vertical array and organize the filled, stacked cartons for delivery to trucks or other transporters.

The bottling equipment, the cartonizing equipment, and the stacking equipment all have various maximum capacities at which the bottles or the filled cartons can be handled and processed. In modern bottling plant operations, it has been found helpful to arrange conveyors between a given bottler and tow or more cartonizers. In this way, should the capacity of a given cartonizer be overcome, the filled bottles can be directed to an alternate cartonizer without seriously interrupting the flow of product through the plant.

In a similar manner, it has been found helpful to arrange conveyors between a given cartonizer and two or more stackers. Again, should a stacker become overloaded, the flow of cartons can be directed to an alternate stacker to avoid interrupting plant operations.

While conveyor arrangements of this kind have been found helpful, their effective use has, until now, required careful personal attention to the flow of bottles or filled cartons through the plant, and quick manual action to start and stop appropriate conveyors whenever back-ups of bottles or filled cartons begin to occur.

Apparatus of the type disclosed and claimed in U.S. Pat. No. 3,599,789 can sort cartons or the like, and can direct the sorted articles along branched conveyor lines. In many applications, this apparatus requires halting and collecting a number of articles on the stem conveyor before the apparatus directs the articles along a branch conveyor. If both U.S. Pat. No. 3,599,789 branch conveyors have been filled with articles, the apparatus is not designed to halt the flow of further articles to the branch conveyors. These operation features are not always desireable in solving the problems addressed by the present invention.

It is accordingly an object of the present invention to provide a conveyor system and related apparatus which will direct articles traveling along a stem conveyor to either of several branch conveyors, and which apparatus does not require sorting mechanisms and related features which are unnecessary for the use described above.

Another object is to provide a dividing conveyor and related apparatus which can halt the flow of articles to the branch conveyors when the branches are full.

It is another object of the present invention to provide a dividing conveyor and related apparatus of the type described which can be offered at relatively modest cost.

Yet another object is to provide such conveyors and related apparatus which will withstand rugged use and will provide reliable service over a long life.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 4 is a sectional view taken substantially in the plane of line 4—4 in FIG. 3; and FIG. 5 is a schematic diagram illustrating control circuitry by which the present invention can be operated.

DETAILED DESCRIPTION

While the invention will be described in connection with a preferred embodiment, it will be understood that it is not intended to limit the invention to this embodiment. On the contrary, it is intended to cover all alternatives, modifications, and equivalents as may be included within the spirit and scope of the invention as defined by the appended claims.

Figure 1:
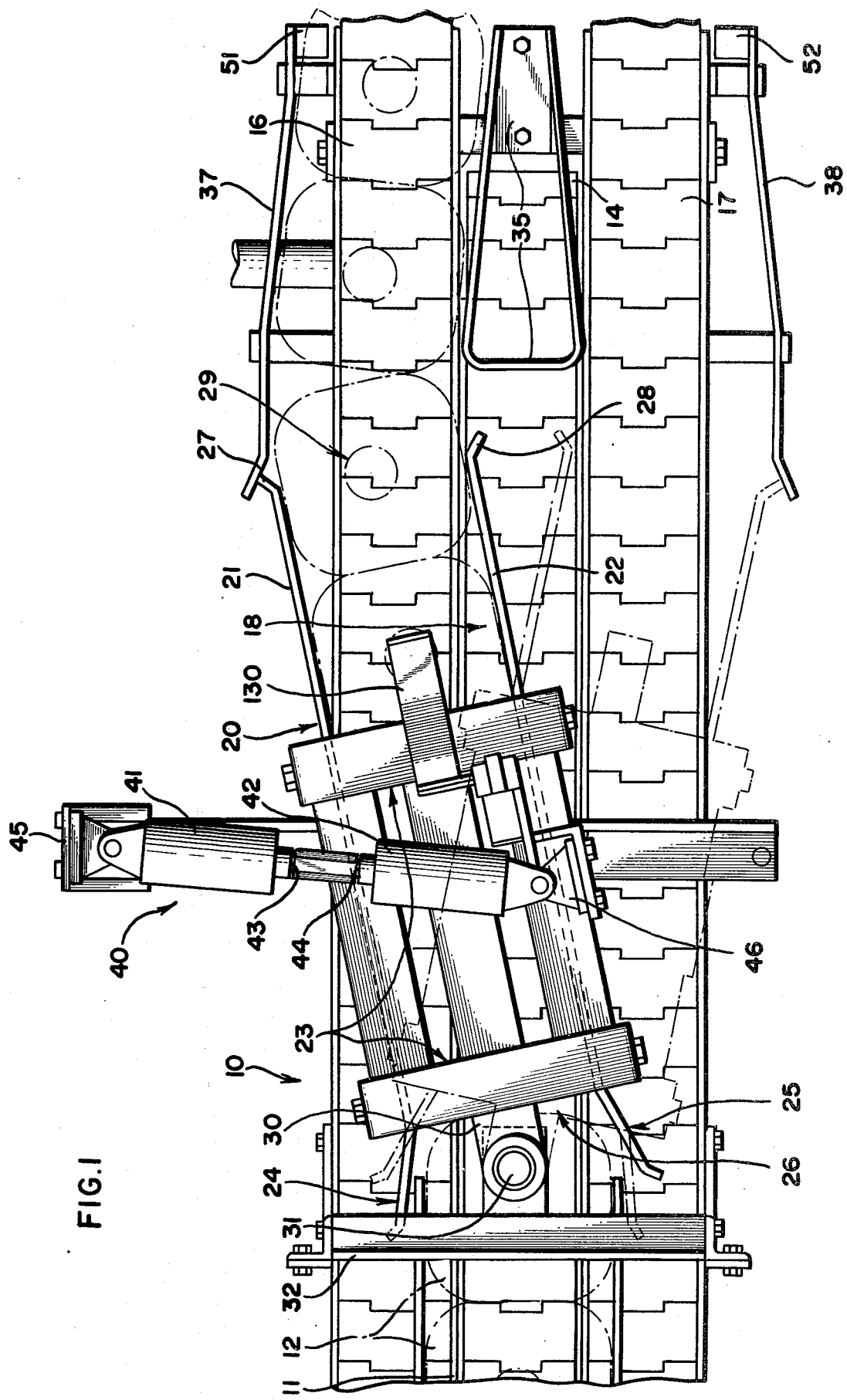
FIG. 1 is a plan view of conveyors and related apparatus embodying the present invention and showing the apparatus in positions to divert articles traveling along a stem conveyor down either of two branch conveyor lines.
Figure 2:
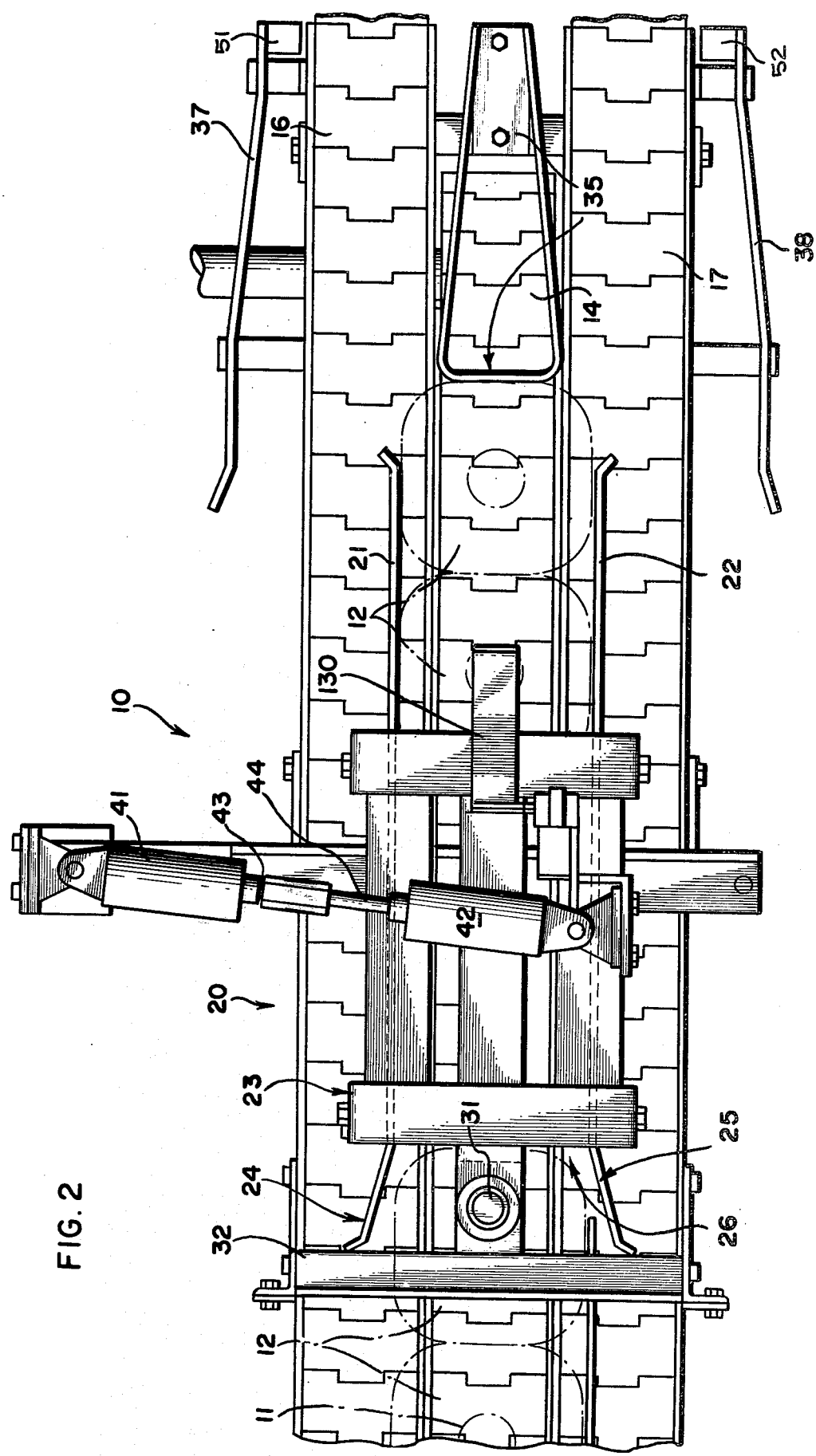
FIG. 2 is a plan view similar to FIG. 1 but showing the apparatus in a position to direct articles traveling along a stem conveyor toward a stop bumper device.
Figure 3:
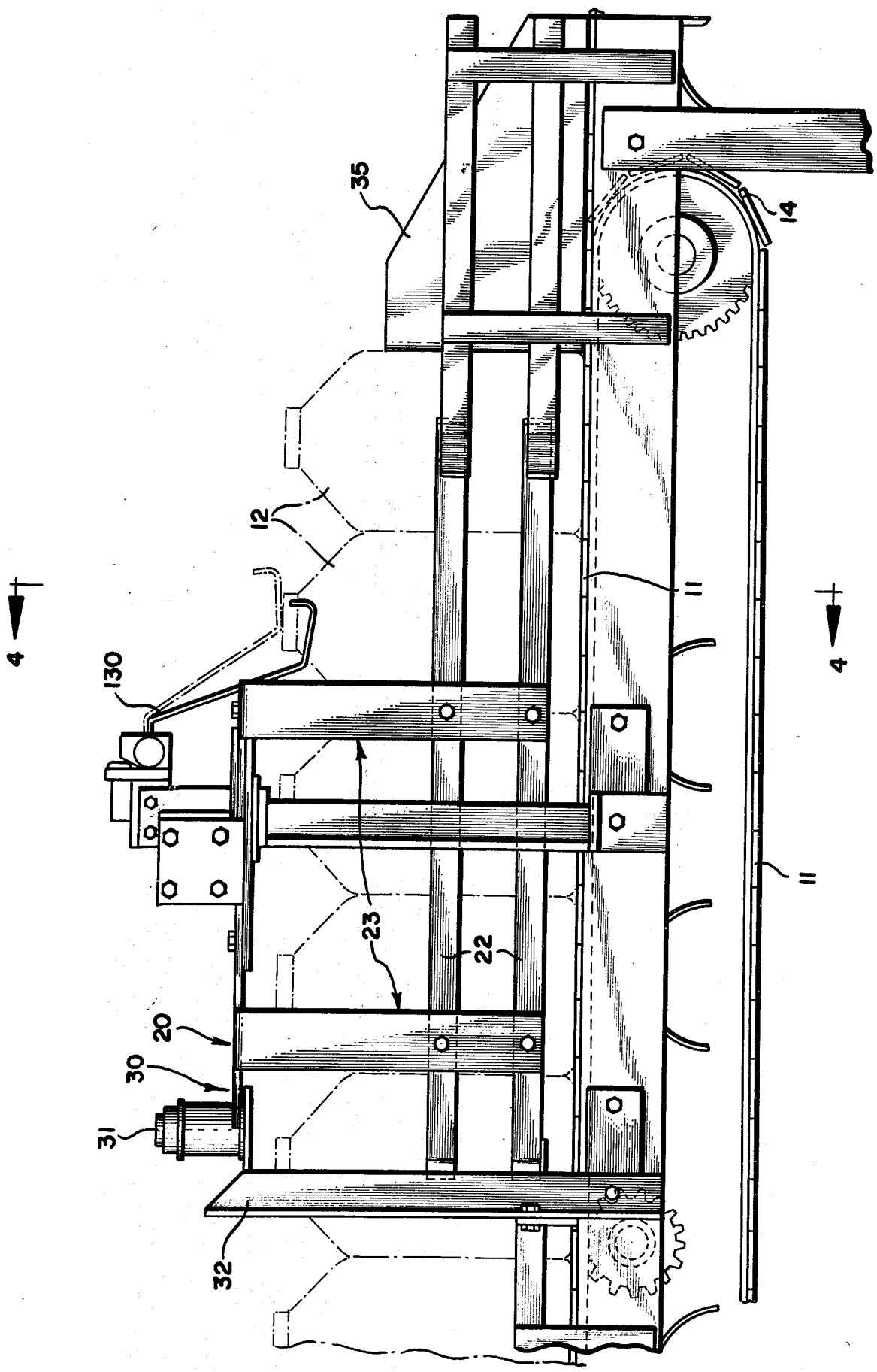
FIG. 3 is a side elevational view of the apparatus shown in FIGS. 1 and 2.

Turning more particularly to FIGS. 1 and 2, there is shown a divider conveyor system embodying the present invention. In general, this divider conveyor system 10 can be considered to include a centralized stem conveyor system 11 along with articles such as milk bottles 12 can travel. Adjacent to the stem conveyor termination region 14, first and second branch conveyors 16 and 17 respectively are located. When the conveyors 11, 16 and 17 are arranged in this way, it will be understood that a conveyor intersection point 18 is defined.

Figures 4, 5:
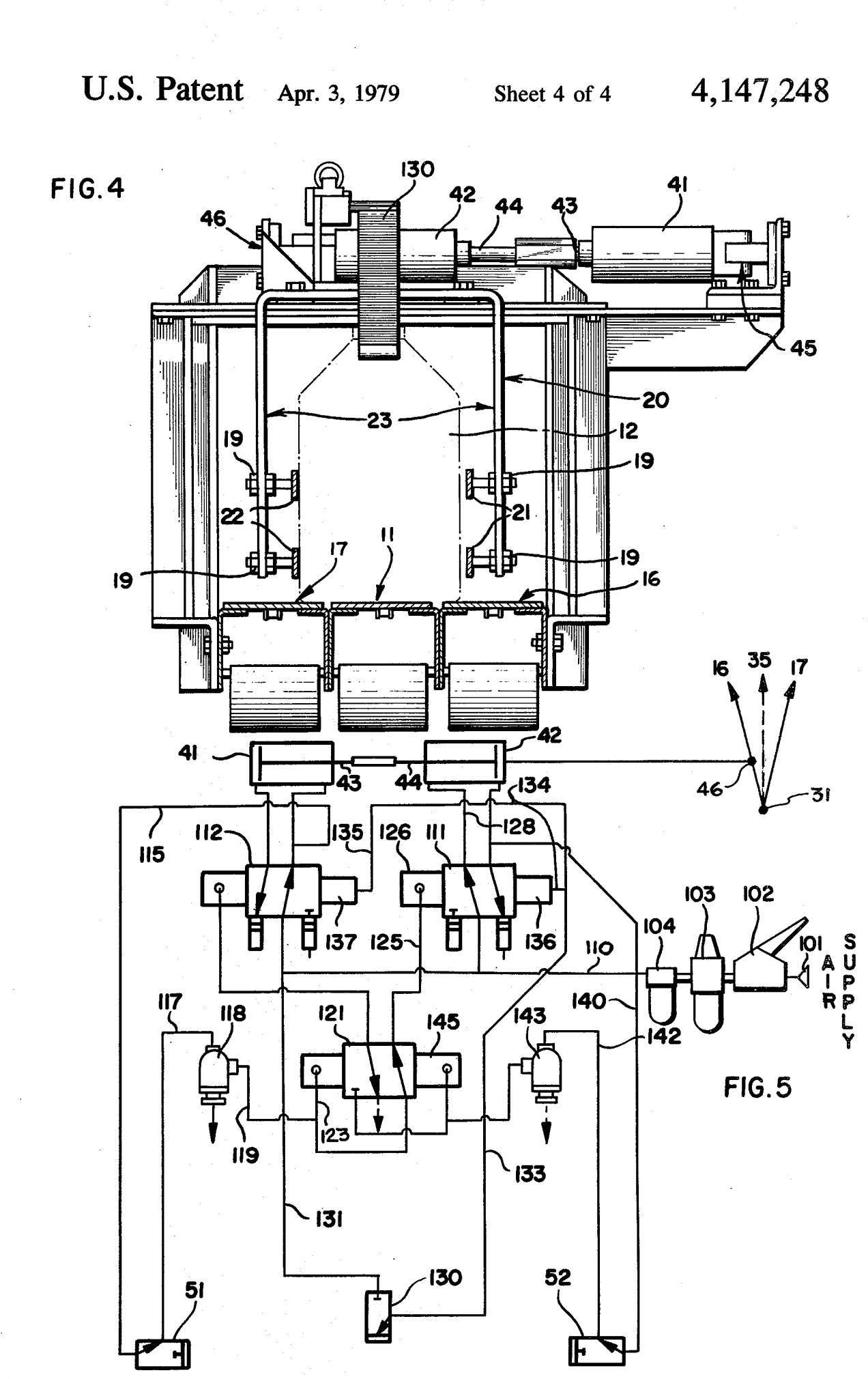

In accordance with the general aspect of the invention, the articles—here, the milk bottles 12—can be inexpensively yet rapidly diverted from the stem conveyor 11 to either the first branch conveyor 16 or the second branch conveyor 17. It will be understood that the system 10 can be modified in size and shape to handle articles such as bottle-accommodating cases or the like without departing from the invention. Here, the diverting action is caused by a diverter assembly 20 disposed over the intersection point 18. This diverter assembly 20 can be inexpensively constructed so as to have a left rail assembly 21 and a right rail assembly 22 held in generally mutually parallel but spaced apart relationships by a yoke member 23. These rails are provided with outwardly flaring ends 24 and 25 at a diverter inlet point 26, and with smaller outwardly flaring ends 27 and 28 at the diverter outlet point 29. These rails 21 and 22 are spaced apart from one another by a distance just slightly greater than the cross-sectional width of the article traveling along the conveyors. The spacing between these rails 21 and 22 can be adjusted by mounting the rails upon pins carried in appropriate fasteners 19 mounted, in turn, upon the yoke 23 (FIG. 4). A yoke extension 30 (FIG. 1) is pivotally affixed, as by a pin 31, to a conveyor bridge assembly 32 so as to maintain the diverter inlet 26 in a position over the stem conveyor 11. However, as the diverter assembly is swung between the positions illustrated in FIGS. 1 and 2, the diverter outlet 29 is located in a first position over the first branch conveyor 16 as illustrated in solid lines in FIG. 1 or, alternatively, can be swung into a second position so as to locate the outlet over the second conveyor 17 as illustrated in phantom lines in FIG. 1. The bottles or articles are retained to transport positions atop the branch conveyors by downstream conveyor side rails 37 and 38.

In further accordance with the invention, the diverter assembly 20 can be swung into yet a third position as illustrated in FIG. 2 so as to direct the milk bottles or other articles 12 against a bumper stop device 35. Under these circumstances, the articles 12 are directed along neither the first branch conveyor 16 nor the second branch conveyor 17, but rather articles moving through the conveyor system are backed up along the stem conveyor 11 and ultimately halted.

In carrying out the invention, the diverter mechanism 20 can be mechanically moved between its first, second and third positions by an inexpensive, yet fast-acting diverter positioner assembly 40. Here this diverter positioner means 40 includes two double-acting fluid power cylinders 41 and 42, each of which are provided with cylinder rods 43 and 44, respectively. The rods 43 and 44 can be independently extended from and retracted into the associated cylinder housings. A first cylinder 41 is pivotally attached to a fixed stanchion device 45, and the other cylinder 42 is pivotally attached to the divider yoke 23, as by a pivotal interconnector device 46.

As can be envisioned from FIGS. 1 and 2, when both cylinder rods are retracted into their respective cylinders, the divider is located in its first position so as to divert bottles from the stem conveyor along the first branch conveyor 16. When both cylinder rods 43 and 44 are extended, the diverter assembly 20 is shiftably swung into the second or phantom-line position shown in FIG. 1 so as to divert bottles from the stem conveyor 11 to the second branch conveyor 17. When one cylinder rod 43 is retracted into its associated cylinder 41 and the other cylinder rod 44 is extended from its cylinder 42, the diverter assembly 20 is shifted into its third position as illustrated in FIG. 2 so as to direct the bottles 12 traveling along the stem conveyor to stack up against the stop bumper device 35.

In carrying out the invention, articles such as the bottles 12 are diverted to one or the other of the branch conveyors 16 or 17 automatically, and without constant human attention. To this end, a first sensor device 51 is mounted near the first conveyor 16 at a point downstream of the conveyor intersection point 18, and a second sensor device 52 is correspondingly mounted near the second branch conveyor 17. Switching circuitry such as that shown in FIG. 5 can be conveniently mounted upon the dividing conveyor as, for example, adjacent the fixed bridge yoke 32. In general, this switch circuitry is connected between each branch sensor 51 and 52 and the diverter positioner assembly 40; the switching circuitry includes appropriate logic devices to direct articles from the stem conveyor 11 to a branch conveyor at which the associated branch sensor 51 and 52 has sensed the absence of bottles 12 on that conveyor 16 or 17.

To accomplish this, the specific pneumatic circuitry shown in FIG. 5 can be employed. Here, compressed air can be introduced from a supply point 101 to an off-on shut off valve 102. Air entering the system is directed through a combined filter, pressure regulator, and pressure gauge device 103, and is next routed through a lubricator device 104 which adds a small amount of oil to the entering air so as to properly lubricate the internal moving portions of the system valves and like parts.

Air is directed from the preliminary units 101–104 through an entry line 110 to cylinder control valves 111 and 112 which power the double acting pneumatic cylinders 42 and 41 respectively. It will be noted that, when the valve 112 is located in the illustrated reset position, air passes through the valve 112 not only to the associated cylinder 41, but is also directed through a branch line 115 to the normally open sensor 51 associated with the first branch conveyor 16 (FIG. 1). Since the sensor 51 is in its open position, air is also directed through line 117, quick exhaust mechanism 118, lines 119 and 123 to the pilot of valve 121 and also through valve 121 and line 125 to the pilot mechanism 126 of valve 111. When the valve 111 is urged into the illustrated piloted position, air is delivered through the entering lines 110, the valve 111, and a delivery line 128 to the rod ends of the cylinders 41 and 42. This air charge causes the cylinders 41 and 42 and the associated rods 43 and 44 to assume the illustrated rod-retracted configurations. When the presence of articles is sensed by the sensor 51, it closes and exhausts the air pressure from the quick exhaust mechanism 118, and a passage line 117. The quick exhaust mechanism 118 in turn exhausts air pressure from the pilots of valve 121 and valve 111 through lines 119, 123, valve 121 and line 125.

It will be noted that air is also supplied from the preliminary devices 101–104 to a safety or anti-jam device 130 through a lead line 131. As shown in FIGS. 1–4, this anti-jam or safety device 130 is located upon the diverter mechanism 20, and, more particularly, is mounted directly over but midway between the rails 21 and 22 so as to sense the presence or absence of articles 12 passing through the diverter device 20. When an article is sensed at the anti-jam mechanism 130, indicating the article is in the proper position for shifting the mechanism 20, sensor 130 opens and directs air pressure from line 131 through lines 133, 134 and 135 to the pilot mechanisms 136 and 137 of valve 111 and valve 112 respectively. Since valve 111 is the only valve which is out of its normal position, the pilot 136 urges it back to its reset position. This causes air from line 110 to be delivered to the blind end of cylinder 42. Air from valve 111 is also directed through line 140 to sensor 52. Under these conditions, the diverter mechanism 20 is urged toward its center, or third position so as to safely stack the traveling articles 12 against the bumper stop 35.

If and when sensor 52 is released by the absence of articles on the second conveyor 17, sensor 52 opens and directs air pressure from line 140 through line 142 and quick exhaust mechanism 143 to pilot mechanism 145 of valve 121. When valve 121 is shifted to its opposite position, air from sensor 52 is directed through valve 121 to the pilot of valve 112 which shifts valve 112 to its opposite position. This causes air from line 110 to be delivered to the blind end of cylinder 41. Valve 112 in the opposite position also exhausts the air pressure from line 115 to sensor 51, to prevent further action until the second conveyor 17 is satisfied.

Under these conditions the diverter mechanism 20 is urged toward its second position, causing articles 12 to be directed into conveyor 17 with which the second sensor 52 is associated. It should be noted however, that the diverter mechanism may shift from its center stop position to whichever conveyor line sensor first senses the absence of articles.

The invention is claimed as follows:

1. A divider mechanism for directing articles traveling along a stem conveyor to either one of a first or a second branch conveyors intersecting the stem conveyor at an intersection point, the divider mechanism comprising, in combination, diverter means disposed over the conveyor intersection point and adapted to divert the articles from the stem conveyor to a branch conveyor, diverter positioner means for locating the diverter means in a first position to divert articles from the stem conveyor to the first branch conveyor, and for alternatively locating the diverter means in a second position to divert articles from the stem conveyor to the second branch conveyor, first branch sensor means located near the first branch conveyor and downstream of the conveyor intersection point for sensing the presence or absence of articles on the first branch conveyor, second branch sensor means located near the second branch conveyor and downstream of the conveyor intersection point for sensing the presence or absence of articles on the second branch conveyor, and switch means connected between each branch sensor means and the diverter positioner means, the switch means including logic means to direct articles from the stem conveyor to a branch conveyor at which the associated branch sensor means has sensed the absence or articles on the branch conveyor, bumper stop means located between the first and second conveyors, said switch means including additional logic means connected to said diverter positioner means so as to locate said diverter means at a third position and direct articles traveling along the stem conveyor against the bumper stop means when the first and second branch sensor means together sense the presence of articles on both the first and second conveyor.

2. A divider mechanism according to claim 1 wherein said divider means includes rail means having an open inlet positioned over the stem conveyor, and an open outlet oriented to be positioned over either of the branch conveyors.

3. A divider mechanism according to claim 2 wherein said rail means includes a left side rail and a right side rail, and a yoke member affixing the side rails in a position substantially parallel to one another.

4. A divider mechanism according to claim 3 wherein the articles traveling along the conveyor have a substantially uniform width of given dimension, the left and right side rails being spaced apart from one another by a distance greater than the article width dimension.

5. A divider mechanism according to claim 4 including adjustable means permitting the distance at which said left side rail and right side rails are spaced apart from one another to be adjustably increased and decreased.

6. A divider mechanism according to claim 1 wherein said diverter positioner means includes a fluid power cylinder means pivoted at one end to a fixed point and pivoted at another end to said diverter means to swing at least a diverter outlet end between said first and second position.

7. A divider mechanism according to claim 1 wherein said divider positioner means includes two fluid power cylinders each having cylinder rods extendable from and retractable into the associated cylinder, one cylinder being pivoted at one end to a fixed point, and the other cylinder being pivoted at one end to said diverter means, the cylinders being connected to each other at their respective other ends, whereby retraction of both cylinders rods locates the diverter means at the first postion, extension of both cylinder rods locates the diverter means at the second position, and retraction of one cylinder rod and extension of the other cylinder rod locates the diverter means at the third position.

8. A divider conveyor device for directing articles traveling along a conveyor system to either one of a first or second system branch, the divider conveyor device comprising, in combination, a stem conveyor, a first branch conveyor, a second branch conveyor, the branch conveyors intersecting the stem conveyor at conveyor intersection point, bumper stop means disposed between the branch conveyors, diverter means disposed over the conveyor intersection point and adapted to divert the articles from the stem conveyor to either one of the branch conveyors or to the bumper stop means, diverter positioner means for selectively locating the diverter means in a first position to divert articles from the stem conveyor to the first branch conveyor, in a second position to divert articles from the stem conveyor to the second branch conveyor, or in a third position to divert articles from the stem conveyor to the bumper stop means, first branch sensor means located near the first branch conveyor for sensing the presence or absence of articles on the first branch conveyor, second branch sensor means located near the second branch conveyor for sensing the presence or absence of articles on the second branch conveyor, and circuit means connected between each branch sensor means and the diverter positioner means, the circuit means including logic means to divert articles from the stem conveyor to a branch conveyor at which the associated branch sensor means has sensed the absence of articles on the branch conveyor, and to divert articles from the stem conveyor to the bumper stop means when the branch sensor means has sensed the presence of articles on both branch convyors.

9. A divider conveyor device according to claim 8 including anti-jam means in said circuit means, the anti-jam means including sensor means mounted on the diverter means and logic means for urging the diverter means toward said third position when articles are sensed in the diverter means.

* * * * *